United States Patent [19]
Rokusek et al.

[11] Patent Number: 6,100,900
[45] Date of Patent: Aug. 8, 2000

[54] DISPLAYING NUMERICAL DATA IN VARIOUS COLORS BASED UPON THEIR RELATIVE CONTRIBUTION TO THE WHOLE

[75] Inventors: Christopher D. Rokusek, Ventura; Larry Rubin, Oxnard, both of Calif.

[73] Assignee: Synopsys, Inc., Mountain View, Calif.

[21] Appl. No.: 08/988,658

[22] Filed: Dec. 11, 1997

[51] Int. Cl.$^7$ .................................................. G06T 11/00
[52] U.S. Cl. .......................................... 345/440; 345/431
[58] Field of Search .................................. 345/440, 431, 345/150, 147; 364/488–490

[56] References Cited

U.S. PATENT DOCUMENTS

| | | | |
|---|---|---|---|
| 4,843,599 | 6/1989 | Bucker | 367/70 |
| 5,043,920 | 8/1991 | Malm et al. | 364/521 |
| 5,313,390 | 5/1994 | Rohrer et al. | 364/468 |
| 5,333,244 | 7/1994 | Harashima | 345/419 |
| 5,335,317 | 8/1994 | Yamashita et al. | 345/419 |
| 5,459,829 | 10/1995 | Doi et al. | 345/452 |
| 5,543,779 | 8/1996 | Aspesi et al. | 340/539 |
| 5,564,420 | 10/1996 | Nazarian et al. | 128/653.1 |
| 5,625,578 | 4/1997 | Du Cloux et al. | 364/578 |
| 5,766,227 | 6/1998 | Nappholz et al. | 607/9 |
| 5,861,891 | 1/1999 | Becker | 345/433 |

*Primary Examiner*—Mark K. Zimmerman
*Assistant Examiner*—Albert K. Lee
*Attorney, Agent, or Firm*—D'Alessandro & Ritchie

[57] ABSTRACT

A method and apparatus for simultaneously displaying numerical data on contribution of various parts to a whole by breaking up the data into the different parts that contributed to the whole and assigning a different color to each. Then the amount of each of these parts is determined and the measurements are plotted by combining the colors into a hue, where the color of the hue represents the relative contribution of the each part for each piece of numerical data.

70 Claims, 4 Drawing Sheets

DISPLAYING NUMERICAL DATA IN VARIOUS COLORS BASED UPON THEIR RELATIVE CONTRIBUTION TO THE WHOLE

BACKGROUND OF THE INVENTION

1. Field of the Invention

The present invention relates to the displaying numerical data. More specifically, the present invention relates to a method and an apparatus for displaying data where the data contains information about the contribution of various parts to a whole.

2. The Prior Art

The presentation of numerical data on a graph has long been known as a reliable way of displaying the data in a clear and straightforward manner that a user can comprehend quickly. In, recent years, computers have been used to speed up the process, as they can quickly compute and display numerous calculations in less than a second.

The rise in the power of computers has also lead to an increase in the use of modeling programs, which allow designers to model the performance of electronic devices before they are manufactured, allowing for a streamlined design process. This type of modeling allows a designer to detect problems with electronic components early in the design stage, before money and time is spent on manufacture of these devices.

One of the problems that is encountered often in the design of electronic devices is excess electromagnetic interference (EMI) radiating from the device. One device that this creates particular problems in is a printed circuit board (PCB). PCBs are usually incorporated into other electronic devices. Excess EMI generated by a PCB can result in improper operation of the components within the electronic device, including the PCB itself. In addition, EMI can affect electronic equipment outside the electronic device, and has even been linked to other problems as well, including the possibility of adverse health effects on humans. Therefore, reducing the amount of EMI generated by a PCB or any other electronic device is extremely important.

Measurement and analysis of EMI is necessary in order to construct PCBs that generate the least amount of EMI and meet the FCC requirements for emissions testing. EMI can be examined by looking at the different processes that occur to cause it. A particular process by which source energy is converted to EMI is known as an EMI mechanism. Although there are many types of EMI mechanisms, certain types of EMI mechanisms take on special importance when dealing with specific electronic components. Diagnosis of not only the strength of overall EMI but the strength of EMI resulting from each individual mechanism is extremely valuable in diagnosis of the PCB (or other electronic device) itself in order to aid in the reduction of overall EMI. Data in the form of "contributions to a whole" are also typical in other fields as well, and the present invention could apply equally to all types of data in this form.

Sometimes, the aforementioned modeling software that simulates the operation of a PCB is used as a diagnostic tool instead of physically measuring the EMI. This technique has the advantage of being able to be performed before the PCB is actually constructed, allowing the designers to test many different manifestations of the PCB without the expense of building numerous different prototypes and physically testing each prototype. In addition, while physical measurement of EMI resulting from individual EMI mechanisms is possible, it has proven to be difficult even in controlled testing environments. Therefore, software modeling is the preferred method of testing the electronic components when discerning among EMI mechanisms.

In the past, EMI has been measured or modeled and then plotted on a graph of field strength versus frequency. This method proved reliable for analyzing overall EMI strength levels generated by an electronic device. However, the prior art method requires that either the user view only an overall EMI level (not broken up into contributions resulting from various EMI mechanisms) or view the amounts of the different EMI levels resulting from the different EMI mechanisms on numerous different graphs (as opposed to on a single graph).

What is needed is a method and a software program that can simultaneously display numerical data that has been split up into contributions to a whole. This would allow the user to measure or model the EMI and plot the relative strength of the different EMI mechanisms on a single graph in a way such that a user can quickly and easily view.

BRIEF DESCRIPTION OF THE INVENTION

A method and apparatus for simultaneously displaying numerical data on contribution of various parts to a whole by breaking up the data into the different parts that contributed to the whole and assigning a different color to each. Then the amount of each of these parts is determined and the measurements are plotted by combining the colors into a hue, where the color of the hue represents the relative contribution of the each part for each piece of numerical data.

DETAILED DESCRIPTION OF THE INVENTION

Those of ordinary skill in the art will realize that the following description of the present invention is illustrative only and not in any way limiting. Other embodiments of the invention will readily suggest themselves to such skilled persons.

Figure 1:
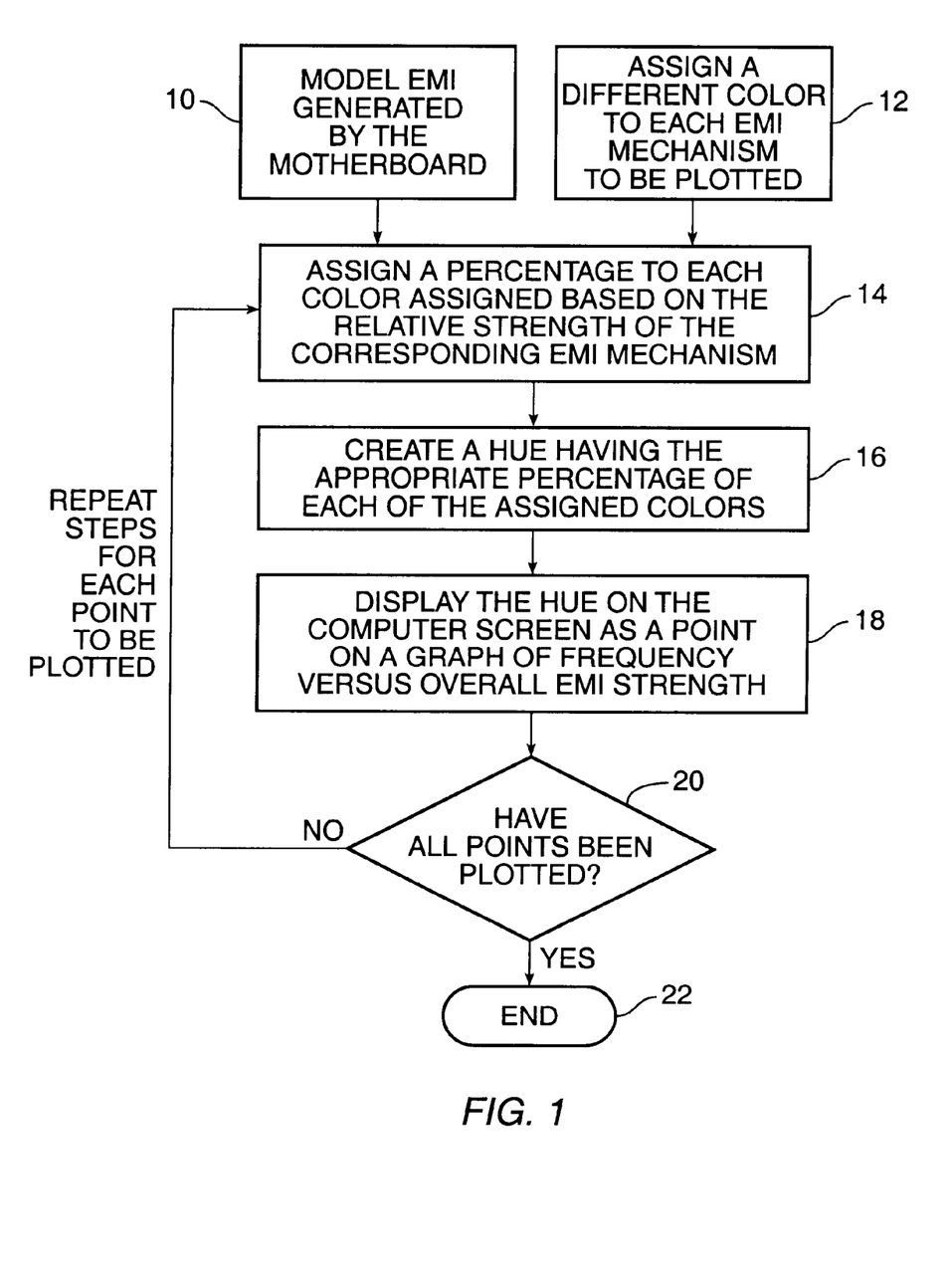
FIG. 1 shows the preferred method of modeling and displaying the EMI mechanism data.

The preferred embodiment of the invention is depicted in FIG. 1. FIG. 1 shows the method used to model EMI generated by a PCB and display the results. First, the modeling of the PCB takes place 10. In measuring or modeling EMI from a PCB, the three most dominant EMI mechanisms are considered: differential mode, voltage driven common-mode, and current-driven common-mode.

Differential mode occurs when current is driven through a transmission line (signal trace) in a circuit. Since a circuit forms a loop, the current initially moves in one direction relative to the PCB, but when it returns on the ground plane or trace, it eventually moves in the exact opposite direction. This causes the board to radiate, much in the same manner as a loop antenna radiates, and the resulting EMI mechanism is called "differential mode".

Voltage driven common mode occurs when high frequency signals or noise are present on a cable that is attached to the PCB, such as a power or a printer cable. When the current is driven through the signal line, a small percentage of it will return through the air as displacement current. The radiation resulting from this mechanism is known as "voltage driven common mode".

Current driven common mode occurs when the signal return current on return planes induces noise voltage across the return plane. This return plane voltage differential exists because a finite plane has inductance through which return current must travel. This noise voltage differential across the return plane will drive other connected cable wires or component heatsinks and creates radiation known as "current driven common mode".

These are just three of the many EMI mechanisms that can be modeled or measured. The present invention should not be limited to modeling or measuring and displaying the above EMI mechanisms. The present invention should also not be limited to displaying data on EMI. The invention will work for any type of data where each piece of data can be broken into individual parts that contributed to the overall data.

Each of these three EMI mechanisms can then be assigned a color 12. In the preferred embodiment of the invention, the differential mode is assigned the color red, the voltage driven common mode is assigned the color blue, and the current driven common mode is assigned the color green. Red, green, and blue were chosen because they are the primary colors, and when combined in varying amounts, can produce any color in the spectrum. However, the invention is not limited to these three colors nor is it limited to any three colors. Any number of colors in any permutation may be used.

The hue formed by combining the colors is determined by assigning a weight to each of the three colors based upon the relative strength of each EMI mechanism. The weight could be assigned as a percentage 14. The hue is then formed by making a color that has the appropriate percentage of each of the assigned colors 16. For example, in the preferred embodiment of the invention, if there is twice as much differential mode measured as voltage driven common mode measured, the resulting hue will have (visually) twice as much red in it as blue. The resulting hue is then plotted on a graph of frequency versus overall EMI strength 18. Then, if all of the points have been plotted 20, the process has been completed 22, otherwise, the process begins again by assigning a percentage to each color based on the data of a different point 14. Several points for each level of frequency will be plotted in order to give a probability breakdown of the EMI. This allows the user to look at the computer monitor and quickly ascertain which EMI mechanisms are producing the most problems at which frequencies. For example, if the overall EMI strength is very high at low frequencies, and the points plotted at those frequencies all appear to be rose colored (indicating a high percentage of red in the hues), then the user would be able to quickly ascertain that differential mode is more of a problem than the other EMI mechanisms, and then he or she could go back and redesign the PCB in an attempt to lower that differential mode at low frequencies. With practice, a user would be able to tell how much of each type of radiation was generated at different frequencies simply by looking at the colors.

Figure 2:
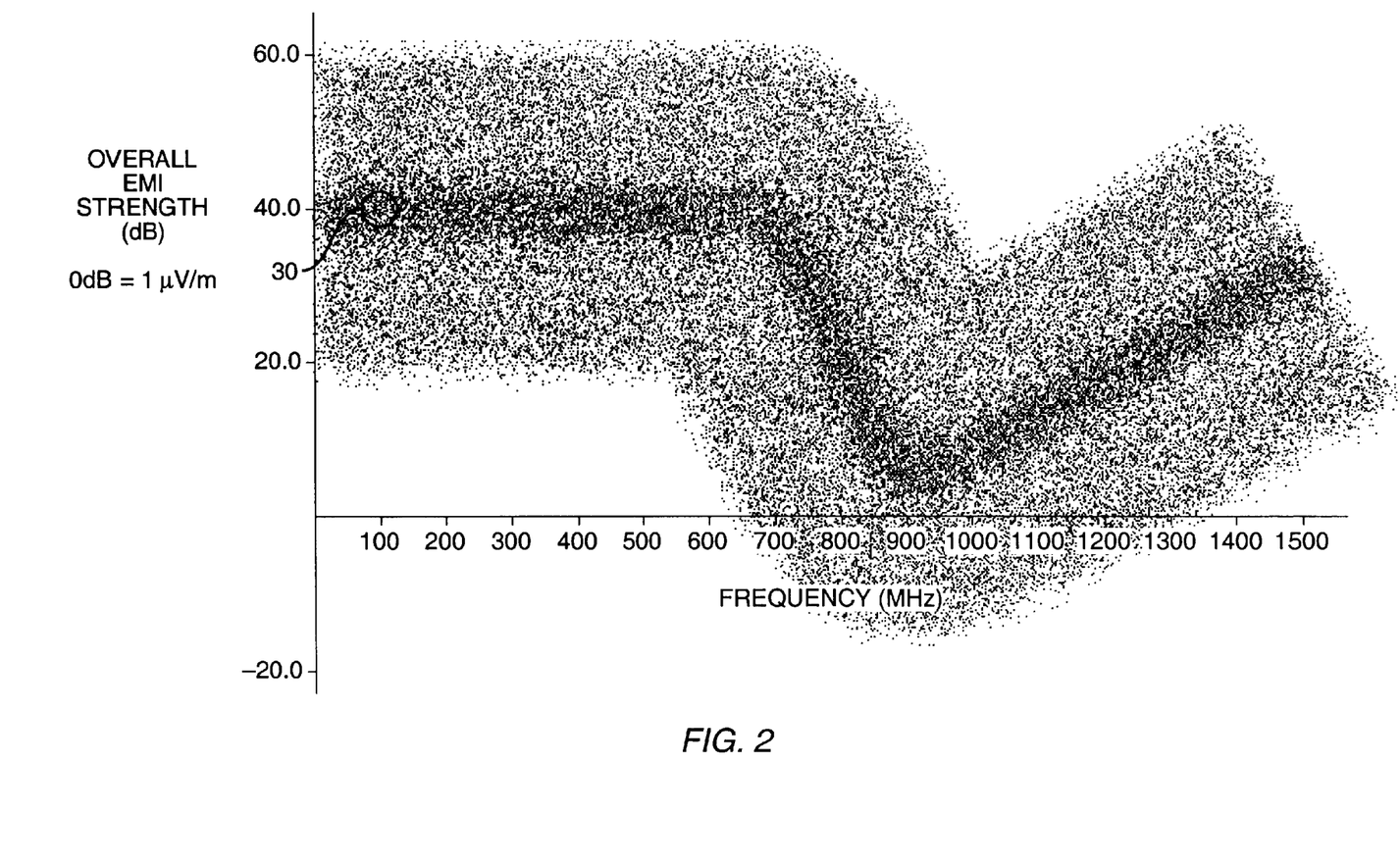
FIG. 2 shows the output that appears on the computer monitor in the preferred embodiment of the invention.
Figure 3:
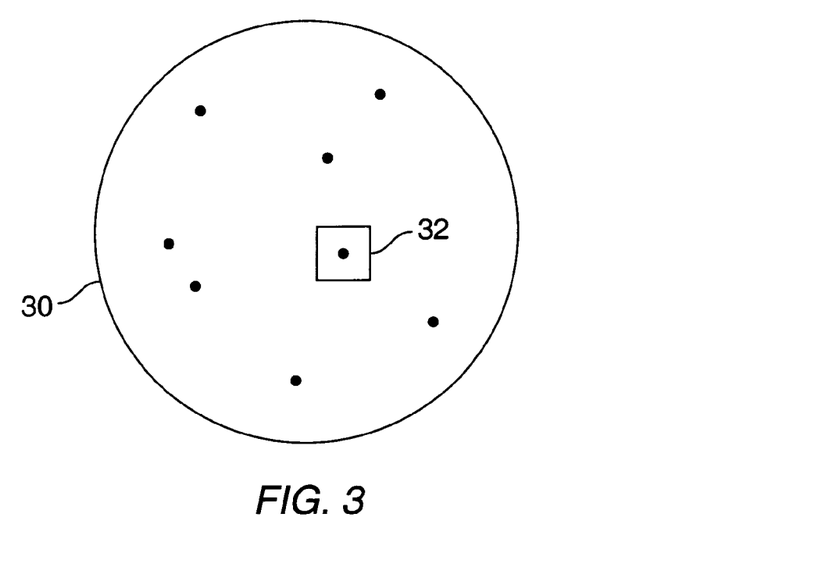
FIG. 3 depicts a magnified view of circle 30 in FIG. 2.
Figure 4:
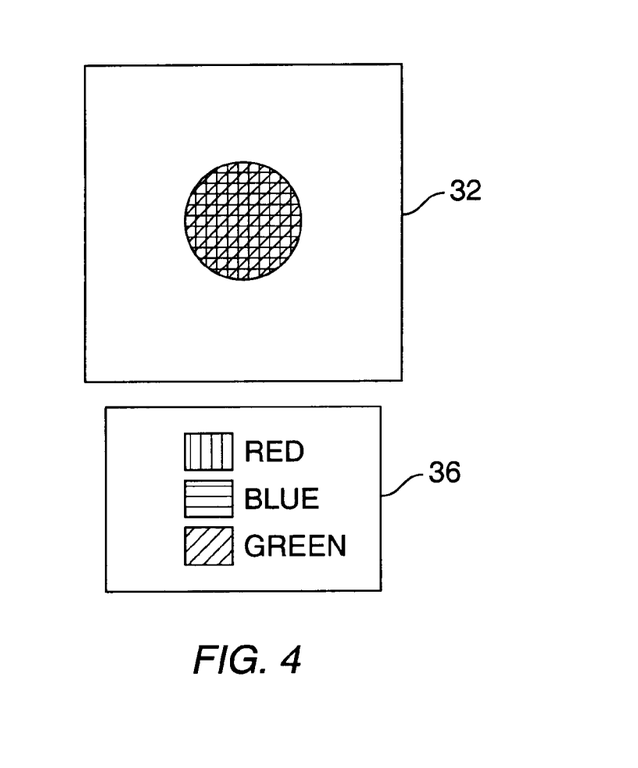
FIG. 4 depicts a magnified view of square 34 in FIG. 3.

FIG. 2 is an example of the graph produced by the preferred embodiment of the invention. In the preferred embodiment of the invention, the strength of EMI is measured in decibels (db) where 0 dB is equivalent to 1 microvolt per meter. If 40.0 dB of EMI was detected at 200 MHz, a point would be plotted on the graph corresponding to that measurement. By taking multiple measurements at each frequency level, a probability graph could be made, as seen in FIG. 2, showing how much EMI radiation would probably be produced at the corresponding frequency level. However, since the preferred embodiment uses a model of a PCB rather than actually measuring radiation from a PCB itself, the probability graph instead reflects the error inherent in the model. For example, in FIG. 2, the majority of points between 0 and 600 MHz seem to fall around the 40 dB level. This signifies that there is a strong probability that the PCB will radiate around 40 dB of EMI throughout this range. However, since the model has a built in error of plus or minus 20 dB, many points are placed up to the 60 dB level and down to the 20 dB level to reflect the fact that while the probability that the PCB will produce around 40 dB of EMI throughout this range is high, it is possible that it will produce as much as 60 dB or as low as 20 dB. FIG. 3 depicts a magnified view of circle 30 of FIG. 2, showing several points. FIG. 4 depicts a magnified view of square 32 of FIG. 3. The color of point 34 is represented by horizontal, vertical, and diagonal lines. In point 34 there are approximately half as many horizontal lines as vertical lines. There are also about half as many diagonal lines as vertical lines. The legend 36 tells us that this means there is about as twice as much red in the hue as blue, and twice as much red in the hue as green. This mixture of red, green, and blue would appear to the user as one color, but it represents a combination of the three.

Due to the nature of black and white figures, it is difficult to demonstrate the different colors produced by the preferred embodiment of the invention. Each point plotted on the graph could conceivably be a different color. The color of each point would tell the user exactly what how much of each type of radiation was detected or modeled at the particular point. For example, a point at 100 MHz and 40 dB that was 50% red, 25% blue, and 25% green, as in the example described above and shown in FIG. 4, would signify to the user that the model predicted a strength of 40 dB of overall EMI at 100 MHz where the contributing EMI mechanisms were 50% differential mode, 25% voltage driven common mode, and 25% current driven common mode in terms of radiated power. Breaking this down, the user could realize that the model predicted 37 dB of differential mode (50% of 40 dB), 34 dB of voltage driven common mode (25% of 40 dB), and 34 dB of current driven common mode (25% of 40 dB).

Similarly, if a point on the graph was entirely green, it would represent to the user that all of the EMI predicted at that frequency was due to the current driven common mode mechanism.

Figure 5:
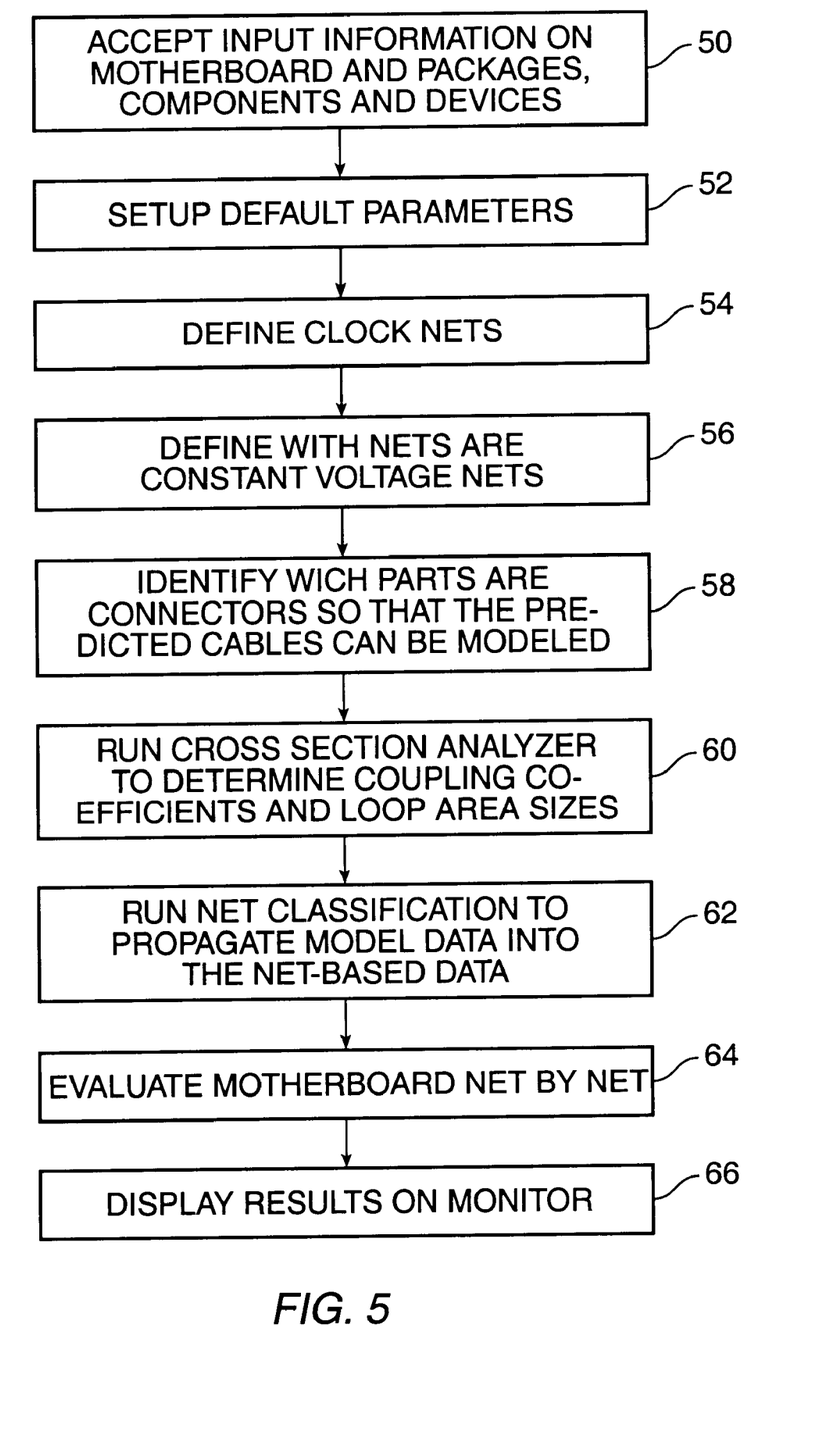
FIG. 5 shows the preferred method of modeling a PCB.

The preferred embodiment contains all these steps in a computer software program, which models the computer PCB performance and displays the graph on a computer monitor. Referring to FIG. 5, this software program first accepts input from the user consisting of the physical layout of the PCB as well as the package, component, and device models 50. Then default parameters may be setup to aid in the modeling process 52. These parameters can take the form of a spreadsheet containing data such as clock frequency, edge rate, maximum current, and maximum voltage swing. The program then defines clock nets and their operating frequencies 54. Each PCB is comprised of a series of nets. It is useful for the user to predict the EMI that will originate from each of these nets as well as that from the PCB as a whole. The program continues by defining which nets are constant voltage nets 56. Then it identifies which parts (by the part number) are connectors so that the predicted attached cables can be modeled as well 58. The program then can run the cross-section analyzer to determine coupling coefficients and loop area sizes 60. At this point, the program is able to run the net classification to propagate model data into the net-based data 62 and evaluate the PCB net by net 64. This evaluation process proceeds by computing the emissions probability spectrum for each net, categorizing it into differential mode, current-driven common mode, and voltage driven common mode mechanisms, and storing the values for later retrieval. At this point, the computer program displays the results on the computer monitor 66 (the steps of which are depicted in FIG. 1). If the user so desires, multiple graphs may be displayed in order to evaluate the PCB net by net or as a whole.

One skilled in the relevant art will realize that these methods could be incorporated using actual measurements of a PCB, rather than using modeling software to emulate the performance of the PCB. The probability graph would then represent the actual breakdown of measurements taken at various frequencies, with multiple points at a frequency level representing multiple measurements taken at a single frequency. One skilled in the relevant art will also realize that the invention could be accomplished outside of a computer system as well, or using only hardware, and could be used to test a wide variety of electronic components, not just a computer PCB.

What is claimed is:

1. A computer-implemented method of simultaneously displaying numerical data on contribution of various parts to a whole, comprising:

assigning a different color to each of the various parts to said whole;

combining the colors into a hue by weighting each of the various parts according to their relative contribution to the whole; and displaying said hue on a graph on a computer display.

2. A method of simultaneously displaying numerical data on contribution of various parts to a whole according to claim 1 wherein said various parts comprise at most 3 different parts and said different colors are chosen from the set consisting of red, green, and blue.

3. A method of simultaneously displaying numerical data on contribution of various parts to a whole according to claim 1, further comprising repeating said assigning, said combining and said displaying for each piece of numerical data to produce a full graph.

4. A computer-implemented method of plotting EMI measurements, comprising:

assigning a different color to each of the various EMI mechanisms to be plotted;

combining the colors into a hue by weighting each color according to the relative strength measured of the corresponding EMI mechanism;

plotting said hue on a graph of frequency versus overall EMI strength; and displaying said graph on a computer display.

5. A method of plotting EMI measurements according to claim 4, further comprising repeating said assigning, said combining, said plotting and said displaying for each frequency level, producing a graph of EMI strength and mechanism versus frequency.

6. A method of plotting EMI measurements according to claim 5, further comprising repeating said assigning, said combining, said plotting and said displaying multiple times for each frequency to produce a probability graph of EMI strength and mechanism versus frequency.

7. A method of plotting the EMI measurements according to claim 4 wherein said various EMI mechanisms to be plotted comprise at most three different EMI mechanisms and said color assigned to each of said various EMI mechanisms to be plotted is chosen from the set consisting of red, green, and blue.

8. A method of plotting EMI measurements according to claim 7, further comprising repeating said assigning, said combining, said plotting and said displaying for each frequency, producing a graph of EMI strength and mechanism versus frequency.

9. A method of plotting EMI measurements according to claim 8, further comprising repeating said assigning, said combining, said plotting and said displaying multiple times for each frequency to produce a probability graph of EMI strength and mechanism versus frequency.

10. A method of plotting EMI measurements according to claim 7 wherein said various EMI mechanisms to be plotted are chosen from the set consisting of differential mode, voltage driven common, and current driven common mode.

11. A method of plotting EMI measurements according to claim 10, further comprising repeating said assigning, said combining, said plotting and said displaying for each frequency, producing a graph of EMI strength and mechanism versus frequency.

12. A method of plotting EMI measurements according to claim 11, further comprising repeating said assigning, said combining, said plotting and said displaying multiple times for each frequency to produce a probability graph of EMI strength and mechanism versus frequency.

13. A method of testing an electronic device, comprising:

measuring the amount of EMI produced by the electronic device;

assigning a different color to each of the various EMI mechanisms to be plotted;

combining the colors into a hue by weighting each color according to the relative strength measured of the corresponding EMI mechanism; and plotting said hue on a graph of frequency versus overall EMI strength.

14. A method of testing an electronic device according to claim 13 wherein the electronic device tested is a PCB.

15. A method of testing an electronic device according to claim 13 wherein said measuring the amount of EMI produced by the electronic device comprises modeling the performance of the electronic device in a computer software program.

16. A method of testing an electronic device according to claim 14, further comprising repeating said measuring, said assigning, said combining and said plotting for each frequency, producing a graph of EMI strength and mechanism versus frequency.

17. A method of testing an electronic device according to claim 16, further comprising repeating said measuring, said assigning, said combining and said plotting multiple times for each frequency to produce a probability graph of EMI strength and mechanism versus frequency.

18. A method of testing an electronic device according to claim 13 wherein said various EMI mechanisms to be plotted comprise at most three different EMI mechanisms and said color assigned to each of said various EMI mechanisms to be plotted is chosen from the set consisting of red, green, and blue.

19. A method of testing an electronic device according to claim 18 wherein the electronic device tested is a PCB.

20. A method of testing an electronic device according to claim 18 wherein said measuring the amount of EMI produced by the electronic device comprises modeling the performance of the electronic device in a computer software program.

21. A method of testing an electronic device according to claim 19, further comprising repeating said measuring, said assigning, said combining and said plotting for each frequency, producing a graph of EMI strength and mechanism versus frequency.

22. A method of testing an electronic device according to claim 21, further comprising repeating said measuring, said assigning, said combining and said plotting multiple times for each frequency to produce a probability graph of EMI strength and mechanism versus frequency.

23. A method of testing an electronic device according to claim 18 wherein said various EMI mechanisms to be plotted are chosen from the set consisting of differential mode, voltage driven common mode, and current driven common mode.

24. A method of testing an electronic device according to claim 23 wherein the electronic device tested is a PCB.

25. A method of testing an electronic device according to claim 23 wherein said measuring the amount of EMI produced by the electronic device comprises modeling the performance of the electronic device in a computer software program.

26. A method of testing an electronic device according to claim 24, further comprising repeating said measuring, said assigning, said combining and said plotting for each frequency, producing a graph of EMI strength and mechanism versus frequency.

27. A method of testing an electronic device according to claim 26, further comprising repeating said measuring, said assigning, said combining and said plotting multiple times for each frequency to produce a probability graph of EMI strength and mechanism versus frequency.

28. A method of modeling an electronic device and displaying EMI information, comprising:
   modeling said electronic device;
   assigning a different color to each of the various EMI mechanisms to be plotted;
   assigning a percentage to each of said different colors based upon the amount of the corresponding EMI mechanism predicted as compared to the amount of overall EMI predicted;
   forming a hue by combining all of said different colors together in a combination reflecting said percentage assigned to each of said different color; and
   displaying said hue on a graph of frequency versus overall EMI strength on a computer monitor.

29. A method of modeling an electronic device and displaying EMI information according to claim 28, further comprising repeating said modeling, said assigning a color, said assigning a percentage, said forming and said displaying for each frequency, producing a graph of EMI strength and mechanism versus frequency.

30. A method of modeling an electronic device and displaying EMI information according to claim 29, further comprising repeating said modeling, said assigning a color, said assigning a percentage, said forming and said displaying multiple times for each frequency to produce a probability graph of EMI strength and mechanism versus frequency.

31. A method of modeling an electronic device and displaying EMI information according to claim 28 wherein said various EMI mechanisms to be plotted comprise at most three different EMI mechanisms and said color assigned to each of said various EMI mechanisms to be plotted is chosen from the set consisting of red, green, and blue.

32. A method of modeling an electronic device and displaying EMI information according to claim 31, further comprising repeating said modeling, said assigning a color, said assigning a percentage, said forming and said displaying for each frequency, producing a graph of EMI strength and mechanism versus frequency.

33. A method of modeling an electronic device and displaying EMI information according to claim 32, further comprising repeating said modeling, said assigning a color, said assigning a percentage, said forming and said displaying multiple times for each frequency to produce a probability graph of EMI strength and mechanism versus frequency.

34. A method of modeling an electronic device and displaying EMI information according to claim 31 wherein said various EMI mechanisms to be plotted are chosen from the set consisting of differential mode, voltage driven common mode, and current driven common mode.

35. A method of modeling an electronic device and displaying EMI information according to claim 34, further comprising repeating said modeling, said assigning a color, said assigning a percentage, said forming and said displaying for each frequency, producing a graph of EMI strength and mechanism versus frequency.

36. A method of modeling an electronic device and displaying EMI information according to claim 35, further comprising repeating said modeling, said assigning a color, said assigning a percentage, said forming and said displaying multiple times for each frequency to produce a probability graph of EMI strength and mechanism versus frequency.

37. A method of modeling a PCB and displaying EMI information on a computer monitor, comprising:
   modeling the EMI generated by a PCB at different frequencies;
   assigning a different color to each of the various EMI mechanisms to be plotted;
   assigning a percentage to each of said different colors based upon the amount of the corresponding EMI mechanism at a particular frequency divided by the amount of overall EMI at said frequency;
   forming a hue by combining all of said different colors together in a combination reflecting said percentage assigned to each of said different colors; and
   displaying said hue on a graph of frequency versus overall EMI strength on a computer monitor.

38. A method of modeling a PCB and displaying EMI information on a computer monitor according to claim 37, further comprising repeating said modeling, said assigning a color, said assigning a percentage, said forming and said displaying for each frequency, producing a graph of EMI strength and mechanism versus frequency.

39. A method of modeling a PCB and displaying EMI information on a computer monitor according to claim 38, further comprising repeating said modeling, said assigning a color, said assigning a percentage, said forming and said displaying multiple times for each frequency to produce a probability graph of EMI strength and mechanism versus frequency.

40. A method of modeling a PCB and displaying EMI information on a computer monitor according to claim 37, wherein said various EMI mechanisms to be plotted comprise at most three different EMI mechanisms and said color assigned to each of said various EMI mechanisms to be plotted is chosen from the set consisting of red, green, and blue.

41. A method of modeling a PCB and displaying EMI information on a computer monitor according to claim 40, further comprising repeating said modeling, said assigning a color, said assigning a percentage, said forming and said displaying for each frequency, producing a graph of EMI strength and mechanism versus frequency.

42. A method of modeling a PCB and displaying EMI information on a computer monitor according to claim 41, further comprising repeating said modeling, said assigning a color, said assigning a percentage, said forming and said displaying multiple times for each frequency to produce a probability graph of EMI strength and mechanism versus frequency.

43. A method of modeling a PCB and displaying EMI information on a computer monitor according to claim 40, wherein said various EMI mechanisms to be plotted are chosen from the set consisting of differential mode, voltage driven common mode, and current driven common mode.

44. A method of modeling a PCB and displaying EMI information on a computer monitor according to claim 43, further comprising repeating said modeling, said assigning a color, said assigning a percentage, said forming and said displaying for each frequency, producing a graph of EMI strength and mechanism versus frequency.

45. A method of modeling a PCB and displaying EMI information on a computer monitor according to claim 44, further comprising repeating said modeling, said assigning a color, said assigning a percentage, said forming and said displaying multiple times for each frequency to produce a probability graph of EMI strength and mechanism versus frequency.

46. A method of modeling a PCB and displaying EMI information on a computer monitor according to claim 38, wherein said modeling the EMI generated by a PCB at different frequencies comprises:

accepting input information on said PCB and its related parts;

setting up default parameters;

defining clock nets;

defining which nets of the PCB are constant voltage nets;

identifying which parts of the PCB are connectors so that predicted cables can be modeled;

running a cross section analyzer to determine coupling coefficients and loop area sizes;

running net classification to propagate model data into the net-based data; and evaluating the PCB net by net.

47. An apparatus for simultaneously displaying numerical data on contribution of various parts to a whole comprising:

a first portion which assigns a different color to each of the various parts to said whole;

a second portion which combines the colors into a hue by weighting each of the various parts according to their relative contribution to the whole; and a third portion which displays said hue on a graph.

48. An apparatus for simultaneously displaying numerical data on contribution of various parts to a whole according to claim 47 wherein said various parts comprise at most 3 different parts and said different colors are chosen from the set consisting of red, green, and blue.

49. An apparatus for simultaneously displaying numerical data on contribution of various parts to a whole according to claim 47 further comprising a fourth portion which displays a different hue for each piece of numerical data to produce a full graph.

50. An apparatus for measuring EMI generated by an electronic device and displaying measurements on a computer monitor, comprising:

a first portion which measures the EMI generated by the electronic device at various frequencies;

a second portion which assigns each of the various EMI mechanisms to be plotted a different color;

a third portion which assigns a percentage to each of said different colors based upon the amount of the corresponding EMI mechanism detected as compared to the amount of overall EMI detected;

a fourth portion which forms a hue by combining all of said different colors together in a combination reflecting said percentage assigned to each of said different color; and a fifth portion which displays said hue on a graph of frequency versus overall EMI strength on a computer monitor.

51. An apparatus for measuring EMI generated by an electronic device and displaying measurements on a computer monitor according to claim 50, wherein the electronic device is a PCB.

52. An apparatus for measuring EMI generated by an electronic device and displaying measurements on a computer monitor according to claim 50, further comprising a sixth portion which determines and plots a different measurement for each frequency, producing a graph of EMI strength and mechanism versus frequency.

53. An apparatus for measuring EMI generated by an electronic device and displaying measurements on a computer monitor according to claim 52, further comprising a seventh portion which determines and plots multiple measurements at each frequency to produce a probability graph of EMI strength and mechanism versus frequency.

54. An apparatus for measuring EMI generated by an electronic device and displaying measurements on a computer monitor according to claim 50, wherein said various EMI mechanisms to be plotted comprise at most three different EMI mechanisms and said color assigned to each of said various type of EMI to be plotted is chosen from the set consisting of red, green, and blue.

55. An apparatus for measuring EMI generated by an electronic device and displaying measurements on a computer monitor according to claim 54, further comprising a sixth portion which determines and plots a different measurement for each frequency, producing a graph of EMI strength and mechanism versus frequency.

56. An apparatus for measuring EMI generated by an electronic device and displaying measurements on a computer monitor according to claim 55, further comprising a seventh portion which determines and plots multiple measurements at each frequency to produce a probability graph of EMI strength and mechanism versus frequency.

57. An apparatus for measuring EMI generated by an electronic device and displaying measurements on a computer monitor according to claim 54, wherein said various EMI mechanisms to be plotted are chosen from the set consisting of differential mode, voltage driven common mode, and current driven common mode.

58. An apparatus for measuring EMI generated by an electronic device and displaying measurements on a computer monitor according to claim 57, further comprising a sixth portion which determines and plots a different measurement for each frequency, producing a graph of EMI strength and mechanism versus frequency.

59. An apparatus for measuring EMI generated by an electronic device and displaying measurements on a computer monitor according to claim 58, further comprising a seventh portion which determines and plots multiple measurements at each frequency to produce a probability graph of EMI strength and mechanism versus frequency.

60. An apparatus for modeling EMI generated by an electronic device and displaying the results on a computer monitor, comprising:
- a first portion which models the EMI generated by the electronic device at different frequencies;
- a second portion which assigns each of the various EMI mechanisms a different color;
- a third portion which assigns a percentage to each of said different colors based upon the amount of the corresponding EMI mechanism detected as compared to the amount of overall EMI detected;
- a fourth portion which forms a hue by combining all of said different colors together in a combination reflecting said percentage assigned to each of said different color; and
- a fifth portion which displays said hue on a graph of frequency versus overall EMI strength on a computer monitor.

61. An apparatus for modeling EMI generated by an electronic device and displaying the results on a computer monitor according to claim 60 wherein the electronic device is a PCB.

62. An apparatus for modeling EMI generated by an electronic device and displaying the results on a computer monitor according to claim 60, further comprising a sixth portion which determines and plots a different measurement for each frequency, producing a graph of EMI strength and mechanism versus frequency.

63. An apparatus for modeling EMI generated by an electronic device and displaying the results on a computer monitor according to claim 62, further comprising a seventh portion which determines and plots multiple measurements at each frequency to produce a probability graph of EMI strength and mechanism versus frequency.

64. An apparatus for modeling EMI generated by an electronic device and displaying the results on a computer monitor according to claim 60 wherein said various EMI mechanisms to be plotted comprise at most three different EMI mechanisms and said color assigned to each of said type of EMI to be plotted is chosen from the set consisting of red, green, and blue.

65. An apparatus for modeling EMI generated by an electronic device and displaying the results on a computer monitor according to claim 64, further comprising a sixth portion which determines and plots a different measurement for each frequency, producing a graph of EMI strength and mechanism versus frequency.

66. An apparatus for modeling EMI generated by an electronic device and displaying the results on a computer monitor according to claim 65, further comprising a seventh portion which determines and plots multiple measurements at each frequency to produce a probability graph of EMI strength and mechanism versus frequency.

67. An apparatus for modeling EMI generated by an electronic device and displaying the results on a computer monitor according to claim 64 wherein said various EMI mechanisms to be plotted are chosen from the set consisting of differential mode, voltage driven common mode, and current driven common mode.

68. An apparatus for modeling EMI generated by an electronic device and displaying the results on a computer monitor according to claim 67, further comprising a sixth portion which determines and plots a different measurement for each frequency, producing a graph of EMI strength and mechanism versus frequency.

69. An apparatus for modeling EMI generated by an electronic device and displaying the results on a computer monitor according to claim 68, further comprising a seventh portion which determines and plots multiple measurements at each frequency to produce a probability graph of EMI strength and mechanism versus frequency.

70. An apparatus for modeling EMI generated by an electronic device and displaying the results on a computer monitor according to claim 61, wherein the apparatus further comprises:
- a sixth portion which accepts input information on said PCB and its related parts;
- a seventh portion which sets up default parameters;
- an eighth portion defining clock nets;
- a ninth portion which defines which nets of the PCB are constant voltage nets;
- a tenth portion which identifies which parts of the PCB are connectors so that predicted cables can be modeled;
- an eleventh portion which runs a cross section analyzer to determine coupling coefficients and loop area sizes;
- a twelfth portion which runs net classification to propagate model data into the net-based data; and
- a thirteenth portion which evaluates the PCB net by net.

* * * * *